United States Patent [19]

Winter et al.

[11] 4,010,233
[45] Mar. 1, 1977

[54] PRODUCTION OF INORGANIC FIBERS

[75] Inventors: Gerhard Winter; Manfred Mansmann, both of Krefeld; Hans Zirngibl, Duisburg, all of Germany

[73] Assignee: Bayer Aktiengesellschaft, Leverkusen, Germany

[22] Filed: Dec. 12, 1973

[21] Appl. No.: 424,229

Related U.S. Application Data

[63] Continuation of Ser. No. 195,501, Nov. 3, 1971, abandoned.

[30] Foreign Application Priority Data

Nov. 6, 1970    Germany ............................ 2054573

[52] U.S. Cl. .................................. 264/63; 106/43; 106/44; 106/55; 106/57; 106/58; 106/65; 106/66; 106/69; 106/73.3; 106/73.33; 106/73.4; 106/73.5; 264/65; 264/204; 264/DIG. 19

[51] Int. Cl.$^2$ ..................... D01D 5/04; C04B 35/10

[58] Field of Search ................ 264/60, 204, 63, 65, 264/DIG. 19; 106/43, 44, 73.32, 55, 57, 58, 65, 66, 69, 73.4, 73.3, 73.5, 73.33

[56] References Cited

UNITED STATES PATENTS

| | | | |
|---|---|---|---|
| 2,886,404 | 5/1959 | Teja | 264/60 |
| 3,082,099 | 3/1963 | Beasley et al. | 264/60 |
| 3,108,888 | 10/1963 | Bugosh | 106/62 |
| 3,180,741 | 4/1965 | Warner et al. | 264/60 |
| 3,311,689 | 3/1967 | Kelsey | 264/210 F |
| 3,322,865 | 5/1967 | Blaze | 264/DIG. 19 |
| 3,428,719 | 2/1969 | Robertson | 264/29 |
| 3,529,044 | 9/1970 | Santeangelo | 264/29 |
| 3,565,749 | 2/1971 | Wizon | 264/63 |
| 3,652,749 | 3/1972 | Sobel et al. | 264/63 |
| 3,705,223 | 12/1972 | Pearson et al. | 264/63 |
| 3,760,049 | 9/1973 | Borer et al. | 264/63 |
| 3,821,070 | 6/1974 | Mansmann et al. | 264/63 |
| 3,846,527 | 11/1974 | Winter et al. | 264/63 |

*Primary Examiner*—Jay H. Woo
*Attorney, Agent, or Firm*—Burgess, Dinklage & Sprung

[57] ABSTRACT

The invention relates to the production of inorganic fibers comprising a metal oxide phase and a finely divided disperse phase distributed throughout the oxide phase, the disperse phase constituting about 0.5 to 50% by weight of the fiber. The process involves preferably dry spinning a solution in water or an organic solvent of fiber forming components which, when heated to temperature of from 500° to 1600° C either in an inert or in a reactive atmosphere, form at least two phases with a miscibility gap, of which one phase is an oxide phase containing the other phase in very finely disperse form. Preferably, the solution contains a metal salt, the anion of which contains carbon so that upon heating there is formed an oxide phase comprising the oxide of said metal having carbon dispersed therein; if carbon is not in the anion, its precursor may be an organic compound, such as a polymer, present in the solution. Other materials which may constitute the disperse phase include boron as well as carbides, nitrides, borides or silicides and some metals. The resulting fiber are of low porosity and high modulus and impart superior properties to plastics, metals, glasses and ceramics reinforced therewith.

39 Claims, No Drawings

PRODUCTION OF INORGANIC FIBERS

This is a continuation of application Ser. No. 195,501, filed Nov. 3, 1971 and now abandoned.

This invention relates to novel inorganic fibres and to a process for their production by spinning systems that are liquid at ambient temperature, and then heat treating the systems. The fibres produced in accordance with the invention can be obtained at relatively low sintering temperatures and are distinguished by particularly good mechanical properties.

Inorganic fibres are acquiring increasingly more significance as high-temperature insulating materials and also as reinforcing materials for plastics, metals, glasses and ceramic materials. The last of these applications requires fibres of high tensile strength and high modulus of elasticity (E modulus). There are numerous methods for producing inorganic fibres, including spinning a melt, depositing fibres from the gas phase on to a substrate, spinning a suitable solution and/or sols and absorbing metal salts in fibrous inorganic polymers (impregnation process), followed by heat treatment.

In solution spinning processes, powdered ceramic materials are either dispersed in a spinnable organic support, or suitable metal salts are dissolved and spun, or special measures such as, for example, polymerising or polycondensing certain salts, or special sol-forming conditions are applied for each individual substance in order to obtain filament-drawing solutions which can subsequently be spun.

The impregnation process uses fibres or organic polymers which are enriched with inorganic material through impregnation with suitable metal compounds. Both the crude fibres produced by solution spinning and also the crude fibres produced by the impregnation process are subjected to a second process stage in which the crude fibres are heated in air and thus freed from the organic supporting material or other volatile constituents and the residual metal oxide skeleton is consolidated by sintering. This sintering process is governed by a number of factors which have a decisive effect both upon the tensile strength and also upon the E modulus of the oxide fibres formed and hence upon their serviceability.

It is known from oxide ceramics that the tensile strength and E modulus of ceramic materials is governed very largely by their porosity in the sense that, where numerous pores are present, only very low tensile strengths and low E moduli can be expected. Thus, densely sintered polycrystalline corundum, for example, has an E modulus of 42,000 kp/mm$^2$ which falls to a level of only 18,000 kp/mm$^2$ for a porosity of 10% (Salmang-Scholze: Die physikalischen und chemischen Grundlagen der Keramik, Berlin, 1968, page 318).

Tensile strength, too, is reduced equally seriously by the presence of pores. It is obvious to the expert to consolidate porous materials of this kind by sintering as is normally done, for example, in the production of ceramic materials. Unfortunately, this process cannot readily be applied to inorganic fibres because sintering is normally accompanied by growth of the crystallites. Unfortunately, large crystallites have a very serious impairing effect upon the tensile strength of polycrystalline fibres (W. L. Lachmann, J. P. Sterry, Chem. Engng. Process, Vol. 58, No. 10, (1962), 37–41), so that they can no longer be used as reinforcing fibres because the improvement in tensile strength and E modulus attributable to the reduction in porosity obtained by sintering cannot be reflected in any way because tensile strength is considerably reduced again by the crystallites which have grown during sintering.

The object of the present invention is to provide a process by which it is possible to produce strong tear-resistant inorganic fibres of high E modulus with as little porosity as possible and with extremely small crystallites. In achieving this object, it was found that it is possible to obtain non-tearing and substantially pore-free inorganic fibres of high E modulus consisting of extremely small crystallites providing one or more phases insoluble in the oxide phase present is precipitated in extremely fine distribution during sintering.

Accordingly, the invention relates to a process for the production of inorganic fibres by spinning fluid systems containing the fibre-forming components, and, optionally, also containing additives, followed by heating, which process is distinguished by the fact that the fibre-forming components used are those of the kind which, when heated to a temperature of from 500° to 1600° C in an inert or reactive atmosphere, form at least two phases with a miscibility gap, of which phases one is intended to be an oxide phase which contains the other phase in very finely disperse form.

In the context of the invention, fluid systems are solutions, sols and/or dispersions. The additives optionally present in the fluid system are linear-polymeric high molecular weight substances with degrees of polymerisation in excess of 10,000.

The fibres produced in this way are characterised by particularly good mechanical properties which are considerably superior to the values found in the pure oxide phase. The process is highly variable. In every case, the fibres obtained are fibres consisting of at least two phases which do not react with one another and of which one phase is referred to in the context of the invention as the "continuous oxide phase", whilst the other phase is referred to in the context of the invention as the "discontinuous disperse phase". Both the continuous oxide phase and also the discontinuous disperse phase can themselves consist of several constituents. The discontinuous phase which is precipitated during the heat treatment and which brings about a marked improvement in the mechanical properties of the fibres, can be present in the continuous oxide phase in a concentration of from 0.5% to 50%, and preferably from 2 to 30%.

The fibre-forming components which can be used for the process of the invention have to fulfill the following requirement: The primary fibres, i.e. the fibres obtained from the spinning solution when subjected to thermal decomposition, should give or contain at least two phases which are either insoluble in one another or which do not react with one another at the decomposition temperature or which show a miscibility gap in their phase diagram within the concentrations used; the continuous oxide phase representing the actual fibre material in which the discontinuous disperse phase, consisting of elements or of compounds such as, for example, carbides, nitrides, borides or silicides, is present in extremely fine dispersion. Examples of the oxides of which the oxide phase can consist include $Li_2O$, $Na_2O$, $B_2O_3$, $BeO$, $MgO$, $TiO_2$, $ZrO_2$, $ThO_2$, $VO_2$, $Cr_2O_3$, $Fe_2O_3$, $Al_2O_3$ and $SiO_2$, also mixtures or combinations of these oxides. The disperse phases consist, for example, of the elements B, C, Si, Ti, V, Cr, Fe and Al or their carbides, nitrides, borides or silicides.

There is a whole number of possible combinations depending on the oxide phase present and the disperse phase added: oxide/element, oxide/carbide, oxide/nitride, oxide/boride and oxide/silicide, the process being by no means limited to these possibilities. The oxide phase can also consist, for example, of several oxides, of combinations of oxides or of oxides dissolved in one another. It is also possible to use several elements or several compounds or element/compound combinations as the disperse phase. The choice is governed by the chemical properties of the individual partners. If the oxide phase consists of a substantially non-reducible oxide such as, for example, BeO, MgO, $SiO_2$ or $Al_2O_3$, it is readily possible to use elements or compounds with an even greater reducing effect such as, for example, C, B or TiC, as the disperse phases. In the case of more readily reducible oxides such as, for example, $TiO_2$, $VO_2$ or $Fe_2O_3$, chemically more stable disperse phases such as, for example, $B_4C$ or SiC are preferred.

A number of methods of producing inorganic fibres consisting of an oxide phase with a second phase finely dispersed therein are described in the following. For example:

A. Oxide fibres with carbon as the disperse phase can be produced from:

1. Metal salts of acids from the group comprising saturated and unsaturated aliphatic, aromatic and mixed aliphatic-aromatic mono-, di- and poly-carboxylic acids and their substitution products, especially with hydroxy, oxo, amino and/or sulphonic acid groups.

2. Metal salts from the group comprising the halides, oxy halides, sulphates, sulphites, nitrates, nitrites, thiocyanates, cyanides, carbonates, hydroxides, formates, acetates or their mixtures in combination with water-soluble organic compounds from the group comprising mono- and poly-saccharides, starch, dextrin, lignin, thiolignin, alkalilignin, lignin sulphonic acid, lignin sulphonates, alginic acids, alginates, gelatin, glue, agar-agar, tragacanth, casein, polyvinyl alcohols, polyethers (e.g. polyethylene glycol), polyimines, polyvinyl pyrrolidones or mixtures thereof.

3. Organo-soluble metal compounds from the group comprising the chlorides, bromides, iodides, thiocyanates, nitrates and alkoxides or their mixtures in combination with organo-soluble carbon-containing substance from the group comprising phenol-formaldehyde resins, polyacrylates, polymethyl methacrylates, polyacrylonitrile, pitch, tar, polystyrene, polyolefins, polybutadienes, polyvinyl compounds, polyester resins, polycarbonates or their mixtures.

B. oxide fibres with boron as the disperse phase:

1. Metal salts from the group comprising halides, oxy halides, sulphates, sulphites, thiocyanates, alkoxides, formates, acetates, cyanides, carbonates, hydroxides, or their mixtures in combination with boron compounds which can be decomposed into boron in an inert gas atmosphere, especially boranes, and their alkali, ammonium or substituted-ammonium salts. The following represent particularly suitable boron compounds of this kind: $NaBH_4$, $K_2B_4H_{10}$, $LiB_5H_9$, $(NH_4)_2B_{10}H_{10}$, $H_2B_{12}H_{12}$, $(NH_4)_2B_{12}H_{12}$, or $[(CH_3)_4N]_2B_{12}H_{12}$.

2. Metal salts of acid-reacting boranes such as, for example, $Me_2B_{10}H_{10}$, $Me_2B_{12}H_{12}$, Me representing the metal forming the oxide phase.

C. Oxide fibres with boron carbide as the disperse phase: 1. Metal salts of acids from the group comprising saturated and unsaturated aliphatic, aromatic and mixed aliphatic-aromatic mono-, di- and poly-carboxylic acids and their substitution products, especially with hydroxy, oxo, amino and/or sulphonic acid groups in combinations with boron compounds which can be decomposed into boron in an inert gas atmosphere, especially boranes and their alkali, ammonium or substituted-ammonium salts.

2. Metal salts from the group comprising halides, oxy halides, sulphates, sulphites, formates, acetates, alkoxides, thiocyanates, cyanides, carbonates, hydroxides or their mixtures in combination with an organic compound which can be decomposed into carbon during the heat treatment and a boron compound which can be decomposed into boron, especially from the group of boranes and their alkali, ammonium or substituted-ammonium salts.

D. Oxide fibres with silicon carbide as the disperse phase:

Organo-soluble metal salts in combination with substances which can be decomposed into SiC in an inert atmosphere, especially a carbosilane polymer.

E. Oxide fibres with silicon nitride as the disperse phase:

Organo-soluble metal salts in combination with alkyl silazanes, especially methyl silazane, or N-substituted alkyl silazanes.

F. Oxide fibres with chromium nitride as the disperse phase:

1. Metal salts of acids from the group comprising saturated and unsaturated aliphatic, aromatic and mixed aliphatic-aromatic mono-, di- and poly-carboxylic acids and their substitution products, especially with hydroxy, oxo, amino and/or sulphonic acid groups, in which at least part of the metal salts consists of a chromium salt.

2. Metal salts from the group comprising halides, oxy halides, sulphates, sulphites, nitrates, nitrites, acetates, formates, alkoxides, thiocyanates, cyanides, carbonates, hydroxides or their mixtures in which case at least part of the metal salts consists of a chromium compound in combination with an organic compound which can be decomposed into carbon by heat treatment.

In cases quoted in sub-paragraph (F) heating is carried out at temperatures at least above 1000° C in an atmosphere of nitrogen.

The crude fibres which are subjected to the thermal after-treatment, can be obtained in different ways by wet or dry spinning; a dry solution spinning process is preferably used. This can be carried out, for example, in a centrifugal spinning machine in which the liquid fibre forming materials are thrown by a rotating spinning head whereby fibres are formed which pass through a drying zone so that they can be subsequently collected. This method is suitable, for example, for the production of staple fibres. However, it is preferred for the production of staple fibres. However, it is preferred to use a conventional dry spinning process. In this case, the spinnable liquids are spun from a spinning head provided with several nozzles substantially at ambient temperature or at a slightly elevated temperature, i.e. at a temperature of from about 10° to 75° C. The filaments travel through a heated spinning duct which, to remove the solvent, is flushed with dry air or with dry nitrogen, and are then collected as staple fibres or wound on to a drum. It is possible to produce crude fibres with a diameter of from 1 to 50 microns, depending upon the concentration and the quality of the spinning solution and also upon the draw-off rate selected.

Solvents for the substances to be spun include water and organic solvents such as, for example, alcohols, hydrocarbons, halogenated hydrocarbons, ethers, esters, acid amides or ketones. Their choice is governed by the solubility and chemical properties of the substances to be spun. Organo-soluble or hydrolysis-prone substances or mixtures of substances which react with one another in water are spun from an organic medium. In the case of substances that are readily soluble in water, or in the case of mixtures of substances which do not react with one another in water, it is preferred to work in an aqueous medium.

It has already been proposed to produce inorganic fibres by spinning solutions, sols or dispersions which, in addition to the required fibre-forming systems, contain additives, namely from 0.001 to 5% by weight of a dissolved linear-polymeric substance with a degree of polymerisation in excess of 10,000. Suitable linear-polymeric substances include vinyl polymers, vinyl copolymers, diolefin polymers, polyethers, polythioethers, polyesters, polyamides and polypeptides. Polyethylene oxide, polyacrylamide, acrylamide-acrylic acid copolymers or their salts, polyisobutylene, polymethyl methacrylate, polyisoprene and polystyrene have proved to be particularly suitable. The crude fibres are preferably produced using these high polymeric substances. However, the process according to the invention is by no means limited to the crude fibres thus obtained; it is also possible to use crude fibres which have been obtained by other methods, for example by spinning polycondensed metal salts, and which have a suitable composition.

The choice of the starting substances from which the crude fibres are produced is governed by that of the aforementioned fibre compositions to which it is desired to decompose the crude fibres. If, for example, it is desired to produce carbon-containing oxide fibres, the procedure adopted is one in which, for example, aqueous solutions of organic metal salts which decompose into metal oxide and carbon under inert conditions, such as, for example, oxalates, tartrates, malates, citrates, pyruvates, malonates, aminoacetates, benzoates, benzene sulphonates, salicylates, sulpho-salicylates, mandelates, glycolates, lactates, fumarates, maleates, succinates, phthalates, phenol sulphonates or mixtures of inorganic salts such as, for example, of chlorides, bromides, iodides, oxide chlorides, sulphates, sulphites, nitrates, nitrites, thiocyanates, cyanides, carbonates, formates, acetates, and hydroxides, with water-soluble inorganic carbon-containing substances such as, for example, starch, lignin, thiolignin, alkalilignin, lignin sulphonic acid, lignin sulphonates, dextrin, alginic acid, alginates, gelatin, glue, agar-agar, casein, tragacanth, mono- and poly-saccharides, polyvinyl alcohol, polyethylene imine, polyvinyl pyrrolidone, polyethylene glycol, are spun into amorphous crude fibres and the resulting crude fibre is heated in an inert or reactive atmosphere.

Organo-soluble metal salts which decompose into metal oxides and carbon under inert conditions, or mixtures of inorganic or organic metal salts, which are soluble in organic solvents, such as, for example, thiocyanates, anhydrous chlorides, bromides, iodides, nitrates or alkoxides with organo-soluble, carbon-containing substances such as, for example, soluble phenol-formaldehyde resins, polyacrylates, polymethyl methacrylates, polyacrylonitrile, pitch, tar, polystyrene, polyolefins, polybutadienes, polyvinyl compounds, polyester resins, polycarbonates or their mixtures, can also be similarly used for producing the fibres. In these cases, the fibres are spun from organic medium. In cases where fusible or volatile compounds are used such as, for example, chlorides, bromides, iodides or alkoxides of polyvalent metals, spinning is best carried out in air, in which case the fibres on their way through the spinning duct actually undergo partial hydrolysis or oxidation during spinning which makes them infusible. As a result, the fibres do not undergo any more fusion during the subsequent heat treatment in an inert atmosphere. At the same time, the partly fusible organic substances used for precipitating the carbon are so firmly surrounded by the oxide or oxide hydrate matrix formed that they are not fused, but instead are pyrolytically decomposed into carbon during the temperature treatment.

The heat treatment of the crude fibres results in the formation of fibres consisting of the particular metal oxide in which extremely finely dispersed carbon is present. These fibres show outstanding mechanical properties, unlike fibres obtained in a similar manner but heated in air. Fibres of this kind do not contain any carbon, are porous and brittle.

To assess the mechanical properties of the fibres, measurements of their tensile strength and E modulus are carried out by tensile tests. A standard micro-tensile testing machine (Tecam Tensile Testing Machine, a product of Messrs. Techne) was used for these tests.

The marked improvement in the mechanical properties of $Al_2O_3$ fibres by the precipitation of very finely dispersed carbon is shown in Table 1 below. The $Al_2O_3$ fibres in question are those of the kind consistently produced in the same way by spinning an organic aluminum salt solution and converted into $Al_2O_3$ by heating for 3 hours to 1100° C in a nitrogen atmosphere. $Al_2O_3$ fibres with a carbon content of less than 0.1% were obtained from crude fibres of aluminum formate, whilst those with a carbon content of 13.7% were obtained from aluminum oxalate. The fibres containing 9% of carbon were obtained from an aluminum oxalato-formate of the composition $Al_{2.8}(C_2O_4)_{1.5}(HCOO)_{5.4}$, those containing 12% of carbon from $Al_{2.3}(C_2O_4)_{1.5}(HCOO)_{3.9}$ and those containing 13.0% of carbon from $Al_2(C_2O_4)_{1.5}(HCOO)_3$. The fibres containing 20.7% and 27.5% of carbon were obtained from aluminum oxalate-aluminium tartrate mixtures, whilst those containing 37% of carbon were produced from pure aluminum tartrate.

As can be seen from Table 1, the carbon-containing aluminium oxide fibres surprisingly show significantly higher tensile strength and E moduli than is the case with a carbon-free $Al_2O_3$ fibre. The positive influence of the carbon is particularly noticeable at a concentration of from 10 to 15%, although it still has a positive effect up to a concentration of approximately 40%.

At the same time, there is evidence of a significant activating effect upon the sintering of the $Al_2O_3$ fibres in the fact that the porosity, which in the carbon-free fibre, amounts to 0.11 cc/g, approaches zero in the range from about 10 to 20% of carbon. The development of particularly large non-distorted crystallites is also effectively prevented by the influence of the carbon; the crystallites of the oxide phase can be kept to values of less than 40 A by adhering to the suitable carbon content. The size of the crystallites was determined by X-ray photography in accordance with Scherrer's formula from the integral width at half of maximum intensity of particularly high intensity reflexes (Laue's method) with no allowance for reflex-widening lattice disturbances. It can also be seen that only δ-$Al_2O_3$ is formed where relatively large quantities of carbon are present, in other words, conversion into other aluminium oxides which drastically impair the properties of the fibres does not take place.

The carbon precipitated in the $Al_2O_3$ fibres produced in accordance with the invention cannot be seen in X-ray photographs. Neither is it possible by extremely intense magnification under an electron microscope to detect any discrete carbon particles. Accordingly, the carbon is present in an extremely finely disperse and amorphous form. The improvement in the mechanical properties of the $Al_2O_3$ fibres produced in accordance with the invention is all the more surprising because it is known that amorphous carbon itself shows only very poor mechanical properties, for example an E modulus of only about 3000 kp/mm².

Similar conditions can also be found in other oxide fibres produced in accordance with the invention having mechanical properties which have been improved by the precipitation of carbon. In no case is it possible to reveal the carbon precipitated by X-ray photographic investigations or by investigations carried out with an electron microscope.

aqueous medium and the crude fibres obtained sintered in the usual way.

Organo-soluble aluminium salts which decompose into oxide and carbon under inert conditions, can also be similarly decomposed, or organo-soluble aluminium compounds such as, for example, $Al(SCN)_3$, $AlCl_3$, $AlBr_3$, $AlI_3$, Al-alkoxides in admixture with organo-soluble carbon-containing substances such as, for example, soluble phenolformaldehyde resins, polyacrylates, polymethyl methacrylates, polyacrylonitrile, pitch, tar, polystyrenes, polyolefins, polybutadiene, polyvinyl compounds, polyester resins, polycarbonates or their mixtures, can be spun from organic medium and converted into carbon-containing $Al_2O_3$ fibres in accordance with the invention. For example, carbon-containing $Al_2O_3$ fibres with improved mechanical properties are obtained by spinning a solution of aluminium propylate in $CH_2Cl_2$ to which tar pitch has been added as carbon donor, followed by heating in a nitrogen atmosphere.

For the manufacture of aluminium fibres containing carbon in finely dispersed form the aluminium can be used in the form of its hydroxides, especially hydrargillite in a highly economic performance of the invention. According to this embodiment preferably spinning solutions are used, which contain aluminium oxalate as well as aluminium formate, the molar ratios of the oxalic acid : formic acid being in the range of from Table 1

Properties of $Al_2O_3$ fibres with different carbon contents $\delta$ = tensile strength in kp/mm², E = modulus of elasticity (determined by Tensile tests) in kp/mm²,
K = crystallite size in A, P = porosity in cc/g.

| % C | $\delta$ | E | P | X-Ray Photographic Examination | | |
|---|---|---|---|---|---|---|
| <0.1 | 28 | 5,800 | 0.11 | $\gamma$-$Al_2O_3$, | $\delta$-$Al_2O_3$, | $\alpha$-$Al_2O_3$ |
| 9 | 49 | 12,400 | 0.06 | | | |
| 12 | 156 | 22,000 | 0 | $\gamma$-$Al_2O_3$ | K = 40 A | |
| 13 | 167 | 17,200 | 0.01 | " | K = 35 A | |
| 13.7 | 181 | 17,500 | 0.01 | " | K = 35 A | |
| 20.7 | 126 | 13,000 | 0.01 | " | K < 25 A | |
| 27.5 | 105 | 8,400 | 0.04 | X-ray amorphous | | |
| 37 | 67 | 6,600 | 0.04 | " | | |

Carbon-containing $Al_2O_3$ fibres can also be produced from other organic aluminium salts, for example aluminium salts of aminocarboxylic acids, dicarboxylic acids, oxy, hydroxy or keto carboxylic acids, and oxy, hydroxy or keto dicarboxylic acids, from salts of aromatic amino, oxy, hydroxy or keto carboxylic acids or aromatic dicarboxylic acid or polycarboxylic acids, from aromatic sulphonic, hydroxy or amino sulphonic acids, or from mixtures of these aluminium salts even in combination with aluminium formate or acetate. However, the process is by no means limited to organic aluminium salts which give carbon-containing $Al_2O_3$ when tempered in an inert gas. It is also possible to start with a water-soluble aluminium salt which, when heated in an inert gas, does not leave any carbon residue, such as, for example, aluminium formate, acetates, $AlCl_3$, $Al(SCN)_3$, $Al(NO_3)_3$, $Al(OH)_2NO_3$, $Al_2(OH)_5Cl$ or other inorganic aluminium salts, and to introduce the carbon into the oxide fibres through another organic substance which gives a carbon residue under these conditions. In these cases, a mixture of the aluminium salt with the organic material which can consist of dextrin, starch, lignin, thiolignin, alkali lignin, lignin sulphonic acid, lignin sulphonate, alginic acid, gelatin, glue, agar-agar, casein, tragacanth, mono- and poly-saccharide or polyvinyl alcohol, is spun from about 2:1 to 1:4, optionally of from 1:1 to 1:3. Most preferably hydrargillite as well as metallic aluminium is used as starting material, whereby the aluminium hydroxide is solved in oxalic acid, where upon metallic aluminium and formic acid is added to the solution. It is, however, also possible to prepare first a solution from aluminium hydroxide and formic acid and thereafter adding metallic aluminium and oxalic acid. The concentration of the final solution is governed by the aforesaid ratio of oxalic acid : formic acid and an aluminium content of about 13 to 16% by weight, calculated as $Al_2O_3$.

The carbon content can be adjusted by suitably choosing the starting materials in such a way that the required mechanical properties are obtained. If the fibres are required to show high tensile strength and E modulus, a carbon content of from 10 to 15% is adjusted in the starting materials. This can be done by the addition of a corresponding quantity of the carbon donor to the inorganic aluminium salt or by selecting a suitable organic salt as the starting substance. Where pure aluminium oxalate is used as starting material, fibres with a carbon content of 13.7% are obtained, whilst in cases where complex oxalato-formates are used as starting materials, the carbon content can be controlled by varying the formate component. The carbon content can be reduced with increasing formate component. Where it is desired to produce particularly soft and flexible fibres, it is best to adjust a relatively high carbon content of from 20 to 40%. In this case, the quantity of the carbon donor can be further increased or alternatively it is possible to start with aluminium tartrate, for example, in which case an $Al_2O_3$ fibre with a carbon content of 37% is obtained. In this case, too, the carbon content can be adjusted to from 13.7% to 37% by using suitable mixtures of, for example, aluminium oxalate and aluminium tartrate.

The process according to the invention described in the foregoing with reference to $Al_2O_3/C$ fibres can be applied to oxide fibres of other elements. In this case, too, fibres with the requisite properties can be produced by adjusting certain quantities of disperse phase.

For example, it is possible to obtain sintered MgO fibres containing carbon as the disperse phase by starting from a magnesium salt (e.g. magnesium citrate) which decomposes into MgO and carbon when heated in an inert gas atmosphere.

To produce a filament consisting of $LiAl_5O_8$ and $Al_2O_3$ with carbon as the disperse phase, it is possible to start, for example, from a solution of the composition $Al_2(C_2O_4)_{1.5}(HCOO)_3$ in which a suitable quantity of $Li_2CO_3$ has been dissolved. If the crude fibres obtained by spinning this solution are heated to 720° C in a stream of nitrogen, a fibre which in addition to $\gamma$-$Al_2O_3$ and $LiAl_5O_8$ contains 7.4% of carbon, is obtained. This fibre has a tensile strength of 61 kp/mm$^2$ and an E modulus of 10,100 kp/mm$^2$. If this fibre is heated to 720° C in air instead of in nitrogen, it consists of the same constituents, but does not contain any carbon, and is so brittle that it does not have any measurable tensile strength.

Magnesium spinel fibres, $MgAl_2O_4$, can be produced, for example, from a solution of aluminium oxalate in which magnesium citrate and magnesium metal have been dissolved in equimolar quantities up to a stoichiometric Al:Mg ratio of 1. The crude fibres spun from this solution sinter at temperatures as low as 900° C in a nitrogen atmosphere to give a fibre which contains 18.4% of carbon and which has a tensile strength of 129 kp/mm$^2$ and an E modulus of 12,800 kp/mm$^2$. A carbon-free fibre that is completely useless is obtained where sintering is carried out in air under otherwise the same conditions.

To produce a carbon-containing spinel fibre of the composition $MgO\cdot3Al_2O_3$, magnesium metal can be dissolved in an aluminium oxalate solution until a ratio of 1 Mg: 3 Al is obtained, and the resulting solution spun into fibres. Heating of these fibres to 900° C in an atmosphere of nitrogen gives fibres containing 15.1% of carbon which have a tensile strength of 178 kp/mm$^2$ and an E modulus of 15,600 kp/mm$^2$. If the fibres are calcined in air at a temperature of up to 900° C, they are free from carbon but extremely brittle and cannot be used for measuring tensile strength.

In general, fibres with a mixed oxid phase comprising MgO and $Al_2O_3$ can be produced by spinning fibre from a solution of magnesium and aluminium salts wherein the molar ratio of Mg to Al ranges from about 2:1 to 1:6. When carbon is to constitute the disperse phase, its source can be the anions set forth in (A) (1) hereinabove or the water-soluble organic compound as set forth in (A) (2) hereinabove. Thus, the solution of mixed aluminium and magnesium salts may be produced by dissolving magnesium metal or a magnesium carbonate, hydroxide, oxalate, tartrate, formate, acetate or citrate in a solution of an aluminium formate, oxalate, citrate or tartrate.

A $Cr_2O_3$ fibre containing 12.1% of carbon can be produced, for example, from a mixture of chromium oxalate and chromium tartrate in a ratio of 4:1. The spun crude fibres can be sintered by heating to 800° C in a nitrogen atmosphere, after which they have a tensile strength of 137 kp/mm$^2$ and an E modulus of 12,300 kp/mm$^2$. Heated in air to 800° C, the $Cr_2O_3$ fibres are obtained free from carbon but with extremely poor mechanical properties.

In all these cases, the carbon cannot be revealed either by X-ray photographic examination or by investigations with an electron microscope. Accordingly, it is present in extremely fine, disperse amorphous form. Despite the poor mechanical properties of the amorphous carbon, however, a significant increase in tensile strength and E modulus does occur in the oxide fibres produced in accordance with the invention in relation to the carbon-free oxide fibres.

Sintered fibres with outstanding mechanical properties can also be similarly obtained by precipitating other elements than carbon. For fibres in which relatively low specific gravity is required, it is preferred to use the lighter elements such as boron, for example, although the process is by no means limited thereto. According to the invention, boron-containing fibres are produced by spinning, for example, a metal salt solution in admixture with a substance which decomposes into boron at elevated temperatures in an inert atmosphere. An oxide fibre containing extremely finely divided boron is obtained in this case. It has been found that the precipitation of boron, for example, promotes sintering in the same way as the precipitation of carbon. At the same time, it is also possible to produce fibres from oxides, oxide mixtures or compounds of two or more oxides in the form of sintered fibres. The precipitation of boron in oxide fibres can be promoted by a number of different boron compounds which decompose under inert conditions to give boron, such as, for example, boranes or their alkali or ammonium salts or substituted ammonium salts such as, for example, $NaBH_4$, $K_2B_4H_{10}$, $LiB_5H_9$, $(NH_4)_2B_{10}H_{10}$, $H_2B_{12}H_{12}$, $(NH_4)_2B_{12}H_{12}$ or $[(CH_3)_4N]_2B_{12}H_{12}$.

If the compounds are sensitive to water, an organo-soluble metal salt is used and the fibres spun from organic medium. The metal forming the oxide phase can also be directly attached to the boron compound. In this case, the process begins with the metal salts in question, the metal forming the oxide fibres being used for salt formation with the acid-reacting boron compound. For example, by dissolving Al in an aqueous solution of the acid $H_2B_{12}H_{12}$ up to an Al:B ratio of 1:6, it is possible to prepare a solution which, spun into fibres, has a composition of 9 $Al_2O_3\cdot2$ $B_2O_3$ on heating to 1100° C in a nitrogen atmosphere, the fibres additionally containing boron in elemental form and extremely fine dispersion as the disperse phase. The fibres show high surface gloss, are flexible and supple and easy to handle. They have a tensile strength of 145 kp/mm$^2$ and an E of 12,800 kp/mm$^2$. A fibre of the same composition, 9 $Al_2O_3\cdot2$ $B_2O_3$, but without any boron, remains so fragile after exposure to the same sintering temperature that neither the tensile strength nor the E modulus can be measured.

Compounds such as, for example, carbides, nitrides, borides and silicides which are precipitated in the fibres in accordance with the invention produce the described improvement in the mechanical properties of oxide fibres. Once again, they are produced by spinning mixtures of metal salts with substances which decompose under inert conditions into the corresponding carbides, borides, nitrides or silicides, or by using metal salts of the kind which, in addition to the oxide phase, form carbides, nitrides, borides or silicides under inert decomposition conditions.

Thus it is possible in accordance with the invention to obtain oxide fibres with boron carbide as the disperse phase by starting, for example, with mixtures of organo-soluble metal salts in dimethyl formamide with $(NH_4)_2B_{12}H_{12}$ and a carbon source, for example polyacrylonitrile, in which case the last-mentioned components form boron carbide as the disperse phase. Water-soluble metal compounds which decompose into oxide and under inert conditions, such as, for example, oxalates, malonates, succinates, malates, citrates, tartrates, pyruvates, glycolates, lactates, fumarates, maleates, aminoacetates, benzoates, benzene sulphonates salicylates, mandelates, phthalates, and phenol sulphonates or their mixtures, can also be used in conjunction with boron donors such as, for example, $NaBH_4$, $K_2B_4H_{10}$, $LiB_5H_9$, $(NH_4)_2B_{10}H_{10}$, $H_2B_{12}H_{12}$, $(NH_4)_2B_{12}H_{12}$, or $[(CH_3)_4N]_2B_{12}H_{12}$, for the production of oxide fibres containing $B_4C$ as the disperse phase. The aforementioned boron donors can also be similarly used in combination with metal salts or their mixtures such as, for example, formates, acetates, chlorides, bromides, iodides, oxide chlorides, sulphates, sulphites, nitrates, nitrites, thiocyanates, cyanides and water-soluble carbon sources such as, for example, mono- and poly-saccharides, starch, dextrin, lignin, thiolignin, alkali lignin, lignin sulphonic acid, lignin sulphonates, alginic acid, alginates, gelatin, glue, agar-agar, casein, tragacanth, polyvinyl alcohol, polyethylene imine, polyethylene glycol, polyvinyl pyrrolidone or their mixtures.

Oxide fibres containing SiC as the disperse phase are obtained in accordance with the invention from mixtures of organo-soluble metal salts with substances which decompose into SiC under inert conditions, such as, for example, $(C_6H_5Si)_n$ or $[(C_6H_5)_2Si]_4$, which are formed during the reaction of $C_6H_5SiCl_3$ with sodium or $(C_6H_5)_2SiCl_2$ with sodium. Relatively high molecular weight carbosilanes of the kind formed, for example, during the cracking of alkyl silanes or alkyl chlorosilanes, are similarly suitable for precipitating SiC as the disperse phase. Thus, mullite fibres, for example, containing SiC as the disperse phase are obtained by spinning a mixture of aluminium propylate with a carbosilane resin obtained by cracking $(CH_3)_4Si$, followed by heating to 900° C in an atmosphere of nitrogen. Mullite fibres which had been otherwise produced and heated to the same temperature but which did not contain any SiC, did not have any strength at all.

Providing suitable metal salts are selected, the precipitation of a carbide as the disperse phase can also be carried out without the assistance of foreign substances. If the process is started with chromium tartrate, for example, and the crude fibres heated under nitrogen to a temperature of 950° C, stable $Cr_2O_3$ fibres containing finely divided $Cr_3C_2$ as the carbidic constituent are obtained. In this case, too, the fibres heated in air which do not contain any chromium carbide are almost impossible to handle on account of their poor mechanical properties.

It is also possible for two different constituents to be present alongside one another as the disperse phase; for example, carbides alongside nitrides, several nitrides, carbides alongside carbon, boron alongside carbon, although this list is by no means representataive of all the possible combinations.

A sillimanite fibre containing $Si_3N_4$ and SiC as the amorphous disperse phase can be obtained, for example, by spinning a solution containing aluminium isopropylate and methyl silazanes obtained by reacting $CH_3SiCl_3$ with $NH_3$. Heating to 1100° C in a nitrogen atmosphere gives an X-ray amorphous fibre, the constituents of which were identified by X-ray photography after heating to 1300° and 1500° C as $Al_2SiO_5$ and $\beta$-$Si_3N_4$, respectively, in addition to SiC. An $Al_2SiO_5$ fibre without any $Si_3N_4$ and SiC heated to the same temperature of 1100° C was unuseable.

The disperse phase can also be formed with the gas used during sintering. Thus, fibres containing chromium nitrides, for example, are formed by starting with a solution containing aluminium and chromium oxalate in a ratio of 2:3, and heating the spun fibres under nitrogen to a temperature of 1400° C. Thereafter, the fibres still contain $\beta$-$Cr_2N$ in addition to CrN in very fine dispersion in the oxide matrix and show outstanding mechanical properties. In this case, nitride formation takes place with the nitrogen used as "inert gas". Heating in air gives fibres which, although free from chromium nitrides, are completely unuseable.

For example, as with magnesium, by using mixtures of chromium salts with aluminium salts it is possible to produce a mixed oxide phase comprising $Al_2O_3$ and $Cr_2O_3$; the anions of the salts can be any of those recited in (A) (1) hereinabove. The molar ratio of Al:Cr preferably ranges from about 1:1 to 1:99.

It has been found that the disperse phases are particularly effective in cases where they are present in fine dispersion and in small crystallite size. Relatively coarse particles exceeding 1000 A prevented the development of a compact structure and, in addition, act as tear centres. In the case of the disperse phase produced in accordance with the invention by precipitation and decomposition, it is readily possible for them to be precipitated in crystallite sizes of far less than 1000 A in extremely fine dispersion. In many cases, the crystallite sizes are less than 30 A and the disperse phase is no longer visible either from X-ray photographs or under an electron microscope. In general, the disperse phase is required to have a crystallite size of less than 1000 A, preferably less than 250 A.

The discontinuous disperse phases precipitated in accordance with the invention promote both an improvement in the production conditions and also an improvement in the mechanical properties of the oxide fibres. In every case, there is evidence of a significant increase in the tensile strength and the E modulus in comparison with fibres that do not contain any disperse phases. Parallel thereto, there is evidence of a considerable intensification in the sintering of the oxide fibres as reflected in the fact that, in the case of the oxide fibres produced in accordance with the invention, the sintering temperatures that have to be applied are significantly lower than the temperatures which normally have to be applied for sintering the corresponding oxides, and further in the fact that the fibres produced in accordance with the invention, even at these low sintering temperatures, show extremely low porosity levels. In addition, the disperse phase has the effect of inhibiting crystallite growth in the oxide phase with the result that fibres with extremely small crystallites in the oxide phase as well are obtained. In addition, it is possible with the aid of the disperse phase to stabilise crystal modifications which normally are not stable at the temperatures in question.

The concentrations of the disperse phase can be varied within wide limits. A lower limit is imposed by the fact that below a certain concentration of the disperse phase the properties of the fibres no longer show any difference from those of a fibre that does not contain any disperse phases. This value is governed both by the oxide phase used and also by the disperse phase. Thus, in the case of carbon-containing $\gamma$-$Al_2O_3$ fibres, for example, significantly improved properties are only obtained above about 3%, whilst in the case of $Cr_2O_3$ fibres, the mechanical properties are considerably improved by as little as 2% of carbon. An upper limit is imposed by the fact that where the disperse phase predominates the properties of the continuous oxide phase are gradually reduced and are converted into the properties of the disperse phase. The normal concentration of the disperse phase is from 0.5 to 50%, although it is preferred to work with a concentration of from 2 to 30%. In the present context, concentration is the total sum of the components by weight of the disperse phase in percent.

The spun crude fibres can be heated under different atmospheres. The choice of the atmosphere is governed by which oxide/disperse phase combination it is desired to produced. Inert gases are normally used. Suitable inert gases include $H_2$, $N_2$, $CO_2$, CO or noble gases. Although $N_2$ is generally preferred, it cannot be used in cases where the disperse phase consists of elements or compounds which react with nitrogen to form nitrides such as Si of for example. If nitride formation is undesirable, noble gases or hydrogen are used to produce the inert gas atmosphere. On the other hand, nitrides can also be precipitated in the oxide fibres in this way.

Heating is carried out by introducing the crude fibres either as such or in milled-, cut-, or woven form into a suitable oven and heating them therein. In most cases, it is sufficient to heat the fibres to the final temperature in order to obtain the optimum mechanical properties. In individual cases, the mechanical properties can be further improved by a thermal after-treatment. Sintering can also be carried out continuously. In this case, the spun crude fibres are combined into rovings and drawn through an oven whose temperature profile is such that temperatures of from 100° to 200 ° C prevail at the inlet end of the oven, a drying process initially being carried out to remove the solvent. In the next temperature zone, the temperature then rises up to about 500° to 600° C. In this temperature zone, the crude fibres are decomposed, their decomposition being accompanied by the elimination of gaseous products, and the oxide phase is formed in what is generally still the amorphous but highly sinterable state with the disperse phase trapped in it. In the following sintering zone, the temperature then rises to the final end value which, if the fibres are to be left standing for a while at this temperature, is kept constant over a more or less long distance, depending upon the rate at which the rovings are drawn through. The fibres can then be cooled relatively quickly back to normal temperature.

The temperature required to sinter the fibres produced in accordance with the invention are surprisingly low and the times required for sintering very short. Normally, it is sufficient to heat the fibres to the sintering temperature over a period of from 30 minutes to 6 hours, although this period does not by any means represent a limitation. Heating can also be carried out in a matter of minutes. It is preferred to work at a heating rate of from 1 to 100° C per minute. In another preferred procedure, heating is carried out at a rate of from 2° to 10° C per minute up to a temperature of about 500° C, and at a rate of from 8° to 60° C per minute at a temperature above 500° C. The final temperature to be adjusted is governed essentially by the composition of the fibres and also by the quantity of finely divided foreign phases precipitated. Even in the case of very high melting oxides, it is considerably reduced in relation to the sintering temperatures normally used.

The sintering-intensifying effect of the finely divided carbon is particularly noticeable in the case of MgO fibres containing 23.7% of carbon. The fibres can be sintered at temperatures as low as 1100° C. Normally, MgO begins to sinter at temperatures above 1900° C on account of its high melting point of 2800° C.

Similarly low sintering temperatures are sufficient in the case of other high melting oxides. Thus, non-tearing sintered spinel filaments, $MgAl_2O_4$, containing 18.4% of carbon can be obtained at temperatures as low as 900° C. Normally, spinel sinters at temperatures above 1500° C on account of its high melting point of 2115° C (Harders-Kienow: Feuerfestkunde, Berlin 1960, pages 33, 34). According to the invention, $Cr_2O_3$ fibres with a carbon content of 4.4% can be produced in sintered form with outstanding mechanical properties at temperatures as low as 800° C.

The fibres produced in accordance with the invention have a number of desirable and, in some cases, completely unexpected properties. Their surface is glossy, they are extremely flexible and not brittle in any way. Fibres which, in addition to the oxide phase, contain finely disperse carbon, for example, can be heated in a flame to white heat without the carbon burning. If the fibres are removed from the flame, they are still flexible and elastic. The inclusion of the disperse phase is so complete that the typical properties which the disperse phase normally shows have disappeared. However, the properties of the oxide phase are also drastically changed. Thus, normal $\gamma$-$Al_2O_3$ is stable at temperatures of up to about 900° C, highly reactive and hygroscopic and is used as an absorbent. The $\gamma$-$Al_2O_3$ fibres obtained in accordance with the invention, containing 12% of carbon for example, are completely inert, non-hygroscopic and stable at temperatures of up to 1100° C. They can be stored under water for weeks on end without losing any of their outstanding mechanical properties. Similarly, improved properties can also be found in other fibres produced in accordance with the invention. These properties make them suitable for numerous purposes. They can be worked by conventional techniques into yarns, woven fabrics, felts, mats, wadding and the like, suitable for use, for example, as high-temperature insulating materials, as filters for hot or aggressive gases and liquids, as reinforcing components in composite materials and as catalyst supports.

By virtue of their outstanding mechanical properties, the fibres produced in accordance with the invention are particularly suitable for reinforcing plastics, metals, glasses and ceramic materials. The mechanical properties of plastics such as, for example, tensile strength, flexural strength, E modulus, can be significantly improved by working in from 1 to 70% by volume of fibres. The fibres can be worked in either as short or staple fibres, as fibrous fleeces or, unidirectionally aligned, as rovings by conventional methods of the kind normally employed for reinforcing synthetic resins with glass fibres. Thus, it is possible, for example, by working in $\gamma$-$Al_2O_3$ fibres containing 13% of carbon produced in accordance with the invention into epoxide resin, for which purpose unidirectionally aligned fibres were used, to obtain a composite material which, when it contains 15% by volume of fibres, has a flexural strength of 2000 kp/cm² and an E modulus (as determined by flexural tests) of 180,000 kp/cm². Where 30% by volume of fibres are present, values of 4500 kp/cm² and 340,000 kp/cm², respectively, are obtained. These values are considerably superior to those measured on pure epoxide resin which has a flexural strength of 1350 kp/cm² and an E modulus of 28,000 kp/cm², and demonstrate the reinforcing and stiffening effect produced by the fibres obtained in accordance with the invention. Other synthetic resins such as, for example, polyurethanes, polyamides, polycarbonates, polyester resins, polyolefins, i.e. thermoplasts and thermoset resins, can also be similarly reinforced.

The composite materials obtained in this way show much greater rigidity in the synthetic resins reinforced with the glass fibres. This is reflected in the E moduli which are considerably lower in the synthetic resins reinforced with equal proportions by volume of glass fibres. In the case of an epoxide rsin reinforced in the same way with glass fibres, they amount to 100,000 kp/cm² for an E-glass fibre content of 15% by volume, and to 190,000 kp/cm² for an E-glass fibre content of 30% by volume.

The process according to the invention is illustrated by the following Examples. All the percentages are percent by weight and refer to the particular system present.

COMPARISON EXAMPLE A

$Al_2O_3$ Fibres 54 g of freshly amalgamated aluminium sheet were dissolved in 276.2 g of formic acid diluted with 1 litre of water. The solution was concentrated in vacuo to a concentration of 19.3% of $Al_2O_3$ by means of a rotary evaporator. 85.3 of this solution were then mixed with 51.2 g of a 2% aqueous polyethylene oxide solution, filtered and degassed, resulting in the formation of a spinning solution containing 12.1% of $Al_2O_3$ and 0.75% of polyethylene oxide. The polyethylene oxide used had a degree of polymerisation of 136,400 and was characterised by its intrinsic viscosity $[\eta] = 9.15$ as measured in $H_2O$ at 35° C for a shear force $\tau = 12.5$ dyne/cm². The spinning solution thus prepared was poured into a spinning vessel comprising nozzles with a diameter of 400 microns, and spun into a duct heated to 100° C and flushed with dry air. The spun fibres were collected and heated in a stream of nitrogen to 1100° C at a heating rate of 6° C per minute.

The white fibres obtained in this way were substantially free from carbon (less than 0.1% C), extremely brittle and fragile. They had a tensile strength of 28 kp/mm² and an E modulus of 5800 kp/mm². The fibres had a porosity of 0.11 cc/g. Investigation by X-ray photography showed that the fibres consisted of a mixture of $\alpha$-$Al_2O_3$, $\gamma$-$Al_2O_3$ and $\delta$-$Al_2O_3$.

EXAMPLE 1

$Al_2O_3$ fibres with carbon as the disperse phase 54 g of amalgamated aluminium were reacted with 378.2 g of $H_2C_2O_4.2 H_2O$ which were dissolved in 1 liter of $H_2O$. The solution was then concentrated to an $Al_2O_3$ content of 16.4%. 73.7 g of this solution were processed with 26.3 g of a 2% aqueous polyethylene oxide solution ($[\eta] = 9.15$) into a spinning solution containing 12.1% of $Al_2O_3$ and 0.53% of polyethylene oxide, as described in Comparison Example 1. The solution was spun into crude fibres which were heated at different rates to 1100° C in an atmosphere of nitrogen.

a. Some of the fibres were heated to 1100° C at 6° C/min. as in Comparison Example A. The fibres obtained were black, glossy and extremely flexible. The fibres had a tensile strength of 181 kp/mm² and an E modulus of 17,500 kp/mm². They contained 13.7% of carbon which was impossible to detect either by X-ray photography or by means of an electron microscope. The oxide phase consisted solely of $\gamma$-$Al_2O_3$ with a crystallite size of 35 A. The fibres were almost completely densely sintered and had a porosity of 0.01 cc/g.

b. The same crude fibres were heated to 1100° C at 2.8° C/min. in a nitrogen atmosphere. The fibres obtained were similar in quality to those obtained in Example 1a). They had a carbon content of 13.9% and they also had a porosity of 0.01 cc/g. These fibres have a tensile strength of 178 kp/mm² and an E modulus of 15,000 kp/mm².

EXAMPLE 2

$Al_2O_3$ fibres with carbon as the disperse phase

A solution of aluminium oxalate was prepared as described in Example 1. However, this solution was not spun with polyethylene oxide, but instead it was concentrated to an $Al_2O_3$ content of 15.0%. The solution had a syrupy, tacky consistency. By dipping glass rods into the solution, and withdrawing them therefrom it was possible to draw fibres which were dried in air. These fibres were heated under nitrogen to 1100° C at 6° C/min. and were thus converted into densely sintered $\gamma$-$Al_2O_3$ fibres containing 12.9% of carbon. They had a tensile strength of 141 kp/mm² and an E modulus of 15,000 kp/mm².

EXAMPLE 3

$Al_2O_3$ fibres containing carbon as the disperse phase

A solution of an aluminium salt of the composition $Al_{2.0}(C_2O_4)_{1.5}(HCOO)_{3.0}$ was prepared from 54.0 g of aluminium, 189.0 g of $H_2C_2O_4·2 H_2O$ and 138 g of HCOOH in 1 litre of water, and concentrated to an $Al_2O_3$ content of 23.3%. 147.4 g of this solution was processed with 79 g of a 2.15% polyethylene oxide solution ($[\eta] = 9.15$) and 16.2 g of $H_2O$ to form a spinning solution containing 14.2% of $Al_2O_3$ and 0.7% of polyethylene oxide.

a. Some of the solution was spun into a heated duct flushed with air and the fibres wound on to a rotating drum. The crude fibres were then taken off from the drum. A narrow ring of fibres was then suspended in a quartz frame stretched by a weight attached to it. The fibres were introduced in this form into an oven and then heated under nitrogen to 1100° C at a rate of 55° C/min. After heating, the fibres were obtained in the form of a strand which was readily divided up into the individual filaments. The fibres again consisted of $\gamma$-$Al_2O_3$ containing 13% of carbon. They were densely sintered and had a tensile strength of 138 kp/mm$^2$ and an E modulus of 16,500 kp/mm$^2$.

b. Another part of the spinning solution was spun into a irregular spun yarn which was heated under nitrogen to 1100° C at 6° C/min. These fibres had a tensile strength of 167 kp/mm$^2$ and an E modulus of 17,200 kp/mm$^2$. They were introduced into a vessel and had water poured over them. After storage for 14 days, the tensile strength and E modulus were remeasured. They had not changed in any way. Thereafter, the fibres were boiled in water for 24 hours. After this procedure, the fibres were still of the same quality. They had a tensile strength of 138 kp/mm$^2$ and an E modulus of 17,200 kp/mm$^2$.

EXAMPLE 4

$Al_2O_3$ fibres with carbon as the disperse phase

A solution of an aluminium salt of the composition $Al_{2.3}(C_2O_4)_{1.5}(HCOO)_{3.9}$ was prepared from 62.1 g of aluminium, 189.0 g of $H_2C_2O_4·2 H_2O$ and 179.4 g of HCOOH in 1 litre of water, and concentrated to an $Al_2O_3$ content of 20.9%. 93.3 g of this solution were mixed with 46.5 g of a 2.1% polyethylene oxide solution ($[\eta] = 9.15$) and 22.7 g of $H_2O$ to form a spinning solution containing 12.0% of $Al_2O_3$ and 0.6% of polyethylene oxide. As in Example 3a), the solution was spun into fibre rings and heated under nitrogen to 1100° C at 6° C/min. The fibres obtained consisted only of $\gamma$-$Al_2O_3$ with a crystallite size of 35 A. The very finely disperse carbon present in a concentration of 12% was not possible to detect either by X-ray photography or by means of an electron microscope. At this stage, the fibres had a tensile strength of 156 kp/mm$^2$ and an E modulus of 22,000 kp/mm$^2$. They were then tempered for 1 hour at 1100° C and remeasured. Thereafter, they had a tensile strength of 173 kp/mm$^2$ and an E modulus of 23,700 kp/mm$^2$.

EXAMPLE 5

$Al_2O_3$ fibres with carbon as the disperse phase 26.3 g of $Al_2(OH)_5Cl·3 H_2O$ were dissolved in 50 g of 2.47% of polyethylene oxide solution ($[\eta] = 9.15$). 5.4 g of solid glycocoll ($NH_2$—$CH_2$—COOH) were then slowly added to the resulting solution, followed by the addition under heat of another 5.5 g dissolved in 15 g of $H_2O$. The spinning solution which contained 12.0% of $Al_2O_3$ and 1.2% of polyethylene oxide, was spun and the fibres sintered by heating under nitrogen to 1100° C. They contained 8.1% of carbon and had a tensile strength of 67 kp/mm$^2$ for an E modulus of 10,000 kp/mm$^2$.

EXAMPLE 6

$Al_2O_3$ fibres with carbon as the disperse phase

An aqueous solution containing 9.05 g of dextrin was mixed with 270 g of an aluminium formate solution containing 7.42% of $Al_2O_3$, prepared by dissolving aluminium in formic acid, and concentrated to an $Al_2O_3$ content of 13.5%. A spinning solution containing 9.6% of $Al_2O_3$ and 0.7% of polyethylene oxide, was prepared therefrom by the addition of an aqueous polyethylene oxide solution ($[\eta] = 9.15$). The spun fibres were again heated to 1100° C in a nitrogen atomsphere. They contained 15.0% of carbon and had a tensile strength of 107 kp/mm$^2$ for an E modulus of 17,500 kp/mm$^2$.

EXAMPLE 7

$Al_2O_3$ fibres with carbon as the disperse phase $Al_2O_3$ fibres with a carbon content of 37.0% were prepared from an aluminium tartrate solution as described in Example 3b). To this end, 54 g of aluminium were dissolved in a solution of 450 g of tartaric acid in 1 liter of water, the resulting solution concentrated to an $Al_2O_3$ content of 12.4% and adjusted to an $Al_2O_3$ content of 7.1% and a polyethylene oxide content of 0.9% by the addition of an aqueous polyethylene oxide solution ($[\eta] = 9.15$).

The sintered fibres consisted of amorphous $Al_2O_3$ and had a tensile strength of 67 kp/mm$^2$ and an E modulus of 6,600 kp/mm$^2$. Unlike the carbon-free fibres described in Comparison Example A which had a comparable E modulus, they were much stronger and more flexible, being comparable with cotton wadding both in feel and quality.

EXAMPLE 8

$Al_2O_3$ fibres with carbon as the disperse phase

A mixture of aluminium tartrate with aluminium oxalate (1:5.11) was used to adjust the carbon content of the $Al_2O_3$ fibres to 20.7%. To this end, 150.8 g of an Al-oxalate spinning solution (prepared as in Example 1) containing 12.1% of $Al_2O_3$ and 0.73% of polyethylene oxide ($[\eta] = 9.15$) were mixed with 50.3 g of Al-tartrate spinning solution (prepared as in Example 7) containing 7.1% of $Al_2O_3$ and 0.86% of polyethylene oxide, and the resulting mixture spun. After the crude fibres had been heated to 1100° C over a period of 190 minutes under a nitrogen atmosphere, soft, flexible $\gamma$-$Al_2O_3$ fibres with a crystallite size of less than 25 A were obtained. The fibres had a porosity of only 0.01 cc/g, a tensile strength of 126 kp/mm$^2$ and an E modulus of 13,000 kp/mm$^2$.

EXAMPLE 9

Fibres of 9 $Al_2O_3·2 B_2O_3$ with boron as the disperse phase $Na_2B_{12}H_{12}$ was converted by means of an ion exchanger into the free acid $H_2B_{12}H_{12}$. Amalgamated Al was dissolved in the aqueous solution of this acid up to a ratio of 2 Al:1 $B_{12}H_{12}$ and the solution concentrated to an $Al_2O_3$ content of 19.9%. 41.1 g of this solution were processed with 3.1 g of glacial acetic acid and 20.9 g of 2.18% of polyethylene oxide solution ($[\eta] = 9.15$) into a spinning solution containing 12.55% of $Al_2O_3$ and 0.7% of polyethylene oxide. The fibres were spun into a duct which was flushed with $NH_3$-containing nitrogen to accelerate gelling, followed by heating under nitrogen to 1100° C at a rate of 47° C/min. The fibres were X-ray amorphous and had a tensile strength of 145 kp/mm$^2$ and an E modulus of 12,800 kp/mm$^2$. By continued heating to 1300° C, it was possible to detect by X-ray photography that the oxide phase consisted of 9 $Al_2O_3·2 B_2O_3$ and the disperse phase of boron.

COMPARISON EXAMPLE B

9 $Al_2O_3·2 B_2O_3$ fibres

Boron-free fibres of the composition 9 $Al_2O_3·2 B_2O_3$ were obtained as follows:

196 g of $Al_2(OH)_5Cl\cdot 3\ H_2O$ containing 46.8% of $Al_2O_3$ and 24.75 g of $H_3BO_3$ were dissolved in water and adjusted to a concentration of 17.7% of $Al_2O_3$ and 2% of $B_2O_3$. 63.5% of this spinning solution were mixed with 6.5 g of 10% of polyethylene glycol solution (molecular weight 4000) and 30 g of 1% of polyethylene oxide (degree of polymerisation 68,200, $[\eta] = 7.1$), resulting in the formation of a spinning solution containing 11.3% of $Al_2O_3$ and 1.7% of $B_2O_3$. The solution was spun as described in Comparsion Example A and the fibres were heated in air to 1100° C. Fibres of the composition 9 $Al_2O_3\cdot 2\ B_2O_3$ were obtained in this way; free from elemental boron, however, these fibres were so brittle that their mechanical properties could not be measured unlike the fibres of Example 9 containing free boron.

EXAMPLE 10

Fibres consisting of $Li_2O\cdot 5\ Al_2O_3$ and $\gamma$-$Al_2O_3$, with carbon as the disperse phase 2.21 g of $Li_2CO_3$ were dissolved in 193.7 g of a solution of $Al_{2.0}(C_2O_4)_{1.5}(HCOO)_{3.0}$ (prepared as in Example 3) containing 7.88% of $Al_2O_3$ and the resulting solution concentrated to 80.3 g. 78.6 g of this solution were processed into a spinning solution with 8.32 g of a 10% polyethylene glycol solution (molecular weight 4000), 16.6 g of a 1% polyethylene oxide solution ($[\eta] = 7.1$) and 7.0 g of $H_2O$. The spun fibres were heated to 720° C at 6° C/min. (a) in nitrogen and (b) in air.

The fibres obtained in accordance with a) contained 7.4% of carbon, were strong, flexible and densely sintered. They have a tensile strength of 61 kp/mm$^2$ and an E modulus of 10,100 kp/mm$^2$. $\gamma$-$Al_2O_3$ in addition to $Li_2O\cdot 5\ Al_2O_3$ is detected by X-ray photography.

The fibres obtained in accordance with b) were found by X-ray photography to have the same composition although they were free from carbon. The fibres were hardly sintered at all, extremely brittle and could not be handled.

EXAMPLE 11

$MgO\cdot Al_2O_3$ fibres with carbon as the disperse phase

A fibre whose oxide phase cnsisted of $MgAl_2O_4$ and which additionally contained 3% of $Al_2O_3$ in excess was prepared as follows: Magnesium metal and magnesium citrate were dissolved in equal molar proportions in an aluminium oxalate solution (prepared as in Example 1) and the resulting solution concentrated to an oxide content ($MgAl_2O_4$ + 3% of $Al_2O_3$) of 16%. The solution was processed with 2.2% of polyethylene oxide solution ($[\eta] = 9.15$) into a spinning solution with a total oxide content of 10.9% and a polyethylene oxide content of 0.7. % After spinning, the fibres were heated under nitrogen to 900° C at a rate of 6° C/min. The fibres were densely sintered, contained 18.4% of carbon and consisted of $MgAl_2O_4$ crystallites 45 A in size. They were found to have a tensile strength of 129 kp/mm$^2$ and an E modulus of 12,800 kp/mm$^2$.

When the same fibres were heated in air to 900° C at a rate of 6° C/min, carbon-free spinel fibres were left behind, being so sensitive that they could no longer be used for measuring the mechanical properties.

When the fibres were heated under nitrogen to only 750° C at 6° C/min., they were also clearly sintered and, at this stage, had a tensile strength of 157 kp/mm$^2$ and an E modulus of 10,700 kp/mm$^2$.

EXAMPLE 12

$MgO\cdot 3\ Al_2O_3$ fibres with carbon as the disperse phase 1.05 g of magnesium were dissolved in 218.7 g of an aluminium oxalate solution containing 13.2 g of $Al_2O_3$ (prepared as in Example 1), the resulting solution filtered and converted by the addition of aqueous polyethylene oxide solution ($[\eta] = 9.15$) into a spinning solution containing 10.3% of $MgO\cdot 3\ Al_2O_3$ and 0.8% of polyethylene oxide. The spun fibres were heated under nitrogen to 900° C at a heating rate of 6° C/min. After sintering, the fibres were black, glossy and extremely flexible. They contained 15.1% of carbon and had a tensile strength of 178 kp/mm$^2$ and an E modulus of 15,600 kp/mm$^2$. When the same fibres were heated in air to 900° C, they were white and they did not contain any carbon, but because they were so brittle, they could not be used for measuring tensile strength.

EXAMPLE 13

MgO fibres with carbon as the disperse phase 11 g of magnesium powder were reacted with 61.5 g of tartaric acid and 400 ml of water. The magnesium tartrate solution formed was filtered, immediately adjusted to a concentration of 13% of MgO and, by the addition of polyethylene oxide solution ($[\eta] = 9.15$) and formic acid, were coverted into a spinning solution containing 5.7% of MgO, 0.8% of polyethylene oxide and 30% of formic acid. The spun fibres were heated to 1100° C at 6° C/min. (a) in air (in which case the fibres were extremely porous and brittle and did not show any strength or flexibility), and (b) in nitrogen (in which case the fibres were clearly sintered, flexible and easy to handle). They contained 23.7% of carbon and consisted of MgO with a crystallite size of 50 A.

EXAMPLE 14

$Cr_2O_3$ fibres with carbon as the disperse phase 104 g of amalgamated chromium were dissolved under heat in a solution of 378.2 g of $H_2C_2O_4\cdot 2\ H_2O$ in 1 liter of water, and concentrated to a $Cr_2O_3$ content of 25.1%. 77 g of this chromium oxalate solution were processed into a spinning solution with 33 g of a 2% polyethylene oxide solution ($[\eta] = 9.15$) and the spinning solution thus obtained spun. The fibres were (a) heated under nitrogen to 800° C at 6° C/min. The fibres obtained contained 4.4% of carbon, were extremely flexible and supple and reached a tensile strength of 102 kp/mm$^2$ and an E modulus of 16,100 kp/mm$^2$; and (b) heated in air to 800° C at 6° C/min. The fibres were hardly sintered at all, they are extremely fragile and they could be rubbed between the fingers into a green powder.

EXAMPLE 15

$Cr_2O_3/TiO_2$ fibres with carbon as the disperse phase 200 g of chromium oxalate solution (prepared as in Example 14) containing 11.5% of $Cr_2O_3$ and 151.2 g of a titanium tartrate solution containing 8% of $TiO_2$ (prepared by dissolving freshly precipitated hydrated $TiO_2$ (prepared by dissolving freshly precipitated hydrated $TiO_2$ in a stoichiometric quantity of tartaric acid) were mixed and the resulting mixture adjusted to an oxide content of 21.45% of $Cr_2O_3\cdot TiO_2$. 110 g of this solution were processed with 54.6 g of 2% polyethylene oxide solution and 17.4 g of $H_2O$ into a spinning solution containing 13% of oxides ($Cr_2O_3 \cdot TiO_2$) and 0.6% of polyethylene oxide. The fibres obtained after spinning were heated under nitrogen to 650° C at a rate of 6° C/min. Even at this low temperature they were highly sintered, extremely flexible and of a textile-like quality. They had a tensile strength of 111 kp/mm². They were completely amorphous according to examination by X-ray photography. When the fibres were heated in air, it was impossible to obtain serviceable fibres under the same conditions.

EXAMPLE 16

3 $Al_2O_3 \cdot 2\ SiO_2$ fibres with SiC as the disperse phase

The cracking of $(CH_3)_4Si$ under nitrogen gave a product from which a solid resin with a softening point of approximately 200° C was obtained as the residue of vacuumed distillation at 250° C; this solid resin consisted of polymeric carbosilanes and, on heating under nitrogen to 1100° C, gave a residue consisting of SiC. 6.6 g of this resin, 16.9 g of aluminium propylate and 0.94 g of polystyrene (degree of polymerisation 125,000) were dissolved with slow stirring in 120 g of $CCl_4$, the resulting solution filtered and then spun into a duct flushed with air that had not been predried. The fibres were then heated under nitrogen to 900° C at a rate of 6° C/min. Thereafter, they were black, densely sintered, strong and flexible. The oxide phase consisted of mullite, 3 $Al_2O_3 \cdot 2\ SiO_2$, in which an amorphous constituent was distributed in very finely disperse form. By heating to 1300° C, it was possible to crystallise this disperse phase which was identified by X-ray photography as SiC.

Mullite fibres which were heated to the same temperature but which did not contain any SiC disintegrated into dust when touched.

EXAMPLE 17

$Al_2SiO_5$ fibres with $Si_3N_4$ and SiC as the disperse phase

A solution of monomeric and oligomeric methyl silazanes was prepared from 62.5 g of $CH_3SiCl_3$ dissolved in 190 ml of $CH_2Cl_2$ by introducing $NH_3$, being freed by filtration from adhering $NH_4Cl$. 38.3 g of this solution which had been adjusted to a solids content of 14.2 g (evaporation residue at 100° C), had added to them a solution of 7.1 g of aluminium isopropylate in 36 g of $CH_2Cl_2$ and 100 g of 0.75% polyethylene oxide solution ($[\eta] = 9.15$) in $CH_2Cl_2$, followed by homogenisation through stirring. The solution was filtered, degassed and spun into a duct rinsed with nitrogen. The fibres obtained were heated under nitrogen to 1100° C at 6° C/min. Sintered, flexible and strong black fibres which were X-ray amorphous were formed. The oxide phase was crystallised by heating to 1300° C, and was identified by X-ray photography as $Al_2SiO_5$. The disperse phase present in amorphous form was also crystallised on heating to 1500° C and identified as a mixture of $\beta$-$Si_3N_4$ and SiC.

An $Al_2SiO_5$ fibre without any $Si_3N_4$ and SiC heated to the same temperature of 1100° C was unserviceable on account of its poor mechanical properties.

EXAMPLE 18

$Cr_2O_3/Al_2O_3$ fibres with chromium nitrides as disperse phase

Fibres with the composition 2 $Cr_2O_3 \cdot 1\ Al_2O_3$ were prepared as follows: 266.0 g of a chromium oxalate solution containing 11.5% of $Cr_2O_3$ (prepared as in Example 14) and 153.8 g of aluminium oxalate solution containing 6.57% of $Al_2O_3$ (prepared as in Example 1) were mixed together and the resulting mixture adjusted to a total oxide content of 21.2%. 70.7 g of this solution were processed into a spinning solution with 0.1 g of $H_2O$ and 29.2 g of a 2.06% polyethylene oxide solution ($[\eta] = 9.15$). After spinning, the fibres were heated under nitrogen at a rate of 6° C/min., sintering being terminated at 900° and 1400° C, respectively. The fibres obtained at 900° C were already highly sintered, showed outstanding tear strength and were flexible. They were found by measurement to have a tensile strength of 148 kp/mm² and an E modulus of 16,800 kp/mm². At this stage, the fibres were X-ray amorphous and contained 6.9% of carbon. At 1400° C, the fibres had a tensile strength of 54 kp/mm² and an E modulus of 27,500 kp/mm². Investigation by analysis and X-ray photography showed that the carbon had reacted with the oxide phase, and that CrN and $\beta$-$Cr_2N$ had precipitated as disperse phase with the nitrogen used as inert gas.

A parallel test conducted with the same fibres led on heating in air to nitride-free fibres of the composition 2 $Cr_2O_3 \cdot 1\ Al_2O_3$; unfortunately, even when heated to 1400° C, these fibres were hardly sintered at all and could be rubbed between the fingers into a green powder.

EXAMPLE 19

$Al_2O_3$ fibres with carbon as the disperse phase 171 g of hydrargillite ($Al_2O_3$ content 65.6%) were heated under reflux in 378 g of $H_2C_2O_4 \cdot 2\ H_2O$ and 476 g of $H_2O$. The solution was filtered and contained 10.2% $Al_2O_3$ with an $Al = C_2O_4^2$ ratio of 2:3.

490.4 g of this solution was mixed with 26.5 g of amalgamated Al (99.9%), 136 g of HCOOH and 40.1 g of water and boiled under reflux. A clear solution with an $Al_2O_3$ content of 14.5% was obtained. The composition of the ingredients correspoded to the formula $Al_4(C_2O_4)_3(HCOO)_6$.

A part of this solution was evaporated to dryness and thereafter heated in a $N_2$-atmosphere to 1100° C at a heating rate of 6°/min. The resulting black residue with a carbon content of 12% consisted of $\gamma$-$Al_2O_3$ according to X-ray investigation and had a particle size of 40 A. Another part of the solution was mixed with a polyethylene solution ($[\eta] = 9.15$) in an amount to adjust the solution to a polyethylene-content of 0.7%. From this solution fibres were produced in accordance with Example 1 a. A black flexible fibre was obtained with a very high E modulus.

EXAMPLE 20

Manufacturing a fibre-reinforced composite material

A mixture of 15 g of an epoxide resin based on epichlorhydrin and bisphenol A (epoxide equivalent weight 185 to 195) containing 10.5 g of hexahydrophthalic acid anhydride as hardener and 0.225 g of dimethyl benzylamine as accelerator was degassed in vacuo, poured into steel moulds, sprayed with a fluoroethylene-polymere as release agent and heated for 1 hour at 120° C. Non-reinforced bars measuring 5.0 × 0.6 × 0.4 cm were produced in this way.

To produce fibre-reinforced test specimens, the aforementioned mixture was poured into the steel moulds, thereafter the $\gamma$-$Al_2O_3$ fibres with 13% carbon (of Example 3 a) were added in an amount of 15 and 30% by volume and in the form of a fibre strand so that all the fibres were unindirectionally aligned. Thereafter, the fibre-containing mixture was compressed to the dimensions 5.0 × 0.6 × 0.4 cm by a steel punch with a gap in it for allowing excess resin through, and the mass hardened for 1 hour at 120° C.

The flexural strength and the E modulus were determined from bending tests conducted on these test specimens:

| Fibre content % by volume | Flexural Strength kp/cm² | E modulus kp/cm² |
|---|---|---|
| 0 (pure resin) | 1350 | 28,000 |
| 15 | 2000 | 180,000 |
| 30 | 4500 | 340,000 |

The test specimens reinforced with E-glass fibres produced in this way gave the following values:

| Fibre content % by volume | Flexural Strength kp/cm² | E modulus kp/cm² |
|---|---|---|
| 15 | 2300 | 100,000 |
| 30 | 4800 | 190,000 |

Despite comparable strength, they showed considerably lower rigidity as reflected numerically in the distinctly lower E modulus.

It will be appreciated that the instant specification and and examples are set forth by way of illustration and not limitation, and that various modifications and changes may be made without departing from the spirit and scope of the present invention.

What is claimed is:

1. In the production of inorganic fibres by dry spinning a solution, sol or dispersion of the fibre-forming material in a solvent to convert the fibre-forming material to solid homogeneous fibre, collecting the fibre and thereafter heat treating the fibre to enhance its physical properties, the improvement which comprises using as said fibre-forming material a composition which upon heating to a temperature of about 500° to 1600° C in an inert or reducing atmosphere in the form of fibre, forms at least two phases with a miscibility gap, of which one phase is a crystalline metal oxide phase containing the other non-oxide phase in very finely disperse form in about 0.5 to 50% by weight of the fibre, and then heating said fibre to about 500° to 1600° C in said inert or reducing atmosphere to form said two phases in the initially homogeneous fibre.

2. A process according to claim 1, wherein the fluid system contains a dissovled organic linear polymer having a degree of polymerization in excess of about 10,000.

3. A process according to claim 2 wherein the linear polymer is present in the fluid system in a concentration of from about 0.001 to 5% by weight.

4. A process according to claim 1, wherein the linear polymer comprises at least one member selected from the group consisting of vinyl homopolymers, vinyl copolymers, diolefin polymers, polyethers, polythioethers, polyesters, polyamides and polypeptides.

5. A process according to claim 4, wherein the linear polymer comprises at least on member selected from the group consisting of polyethylene oxide, polyacrylamide, acrylamide-acrylic acid copolymers or their salts, polyisobutylene, polymethyl methacrylate, polyisoprene and polystyrene.

6. A process according to claim 1, wherein the fluid system contains a compound of at least one metal selected from the group consisting of Li, Na, Be, Mg, B, Ti, Zr, Th, V, Cr, Fe, Al and Si, whereby upon heating to about 500° to 1600° C the oxide of said metal forms said oxide phase.

7. A process according to claim 1, wherein the fluid system contains a compound of at least one member selected from the group consisting of boron and carbon, which compound upon heating to about 500° to 1600° C forms elemental boron, carbon or a mixture thereof as the disperse phase.

8. A process according to claim 1, wherein the fluid system contains a compound of at least one member selected from the group consisting of B, C, Si, Ti, V, Cr, Fe and Al which compound upon heating to about 500° to 1600° C forms the corresponding element or a carbide, nitride, boride or silicide thereof as the disperse phase having a crystallite size of less than about 1000 Å.

9. A process according to claim 1, wherein heating is carried out in an atmosphere of at least one gas selected from the group consisting of $H_2$, $N_2$, $CO_2$, CO and a noble gas.

10. A process according to claim 9 wherein heating is carried out in an atmosphere consisting essentially of nitrogen.

11. A process according to claim 1, wherein heating is carried out at a rate of from about 1° to 100° C/min.

12. A process according to claim 6, wherein the fluid system contains at least one metal salt of an acid selected from the group consisting of saturated and unsaturated aliphatic, aromatic and mixed aliphatic-aromatic mono, and poly-carboxylic acids and their hydroxy, oxo, amino or sulfonic acid substitution products, whereby upon heating said fibres there is formed an oxide phase comprising the oxide of said metal having carbon dispersed therein as said disperse phase.

13. A process according to claim 6, wherein the fluid system comprises water having dissolved therein at least one metal salt of an anion selected from the group consisting of halides, oxyhalides, sulfates, sulfites, nitrates, thiocyantes, cyanides, carbonates, hydroxides, formates and acetates, and at least one water-soluble organic compound selected from the group consisting of mono- and polysaccharides, lignin, thiolignin, alkali lignin, lignin sulfonic acid, lignin sulfonates, gelatin, glue, agar-agar, casein, tragacanth, polyvinyl alcohols, polyethers, polyimines and polyvinyl pyrolidones, whereby upon heating the fibres there is formed an oxide phase comprising the oxide of said metal having carbon dispersed therein as the disperse phase.

14. A process according to claim 6, wherein the fluid system comprises an organic solvent having dissolved therein at least one metal compound of an anion selected from the group consisting of chloride, bromide, iodide, thiocyanate, nitrate and alkoxide and at least one organo-soluble carbon-containing substance selected from the group consisting of phenol-formaldehyde resins, polyacrylates, polymethyl methacrylates, polyacrylonitrile, pitch, polyolefins, polyvinyl compounds, polyester resins and polycarbonates, whereby upon heating the fibres there is formed an oxide phase comprising the oxide of said metal having carbon dispersed therein as the disperse phase.

15. A process according to claim 6, wherein the fluid system contains at least one metal compound of an anion selected from the group consisting of halides, oxyhalides, sulfates, sulfites, thiocyanates, alkoxides, cyanides, carbonates, formates, acetates and hydroxides, and at least one boron compound decomposible into elemental boron upon heating in an inert atmosphere, heating being effected in an inert atmosphere whereby there is formed an oxide phase comprising the oxide of said metal having boron dispersed therein as the disperse phase.

16. A process according to claim 15, wherein the boron compound decomposible into boron in an inert atmosphere comprises $NaBH_4$, $K_2B_4H_{10}$, $LiB_5H_9$, $(NH_4)_2B_{10}H_{10}$, $H_2B_{12}H_{12}$, $(NH_4)_2B_{12}H_{12}$ or $[(CH_3)_4N]_2B_{12}H_{12}$.

17. A process according to claim 15, wherein the boron compound comprises the aluminum salt of the acid $H_2B_{12}H_{12}$ or $H_2B_{10}H_{10}$, whereby the oxide phase comprises aluminum oxide having boron dispersed therein as the disperse phase.

18. A process according to claim 6, wherein the fluid system contains at least one metal salt of an acid selected from the group consisting of saturated and unsaturated aliphatic, aromatic and mixed aliphatic-aromatic mono-, and polycarboxylic acids and their hydroxy, oxo, amino, or sulfonic acid substitution products, and at least one boron compound decomposible into boron upon heating in an inert atmosphere, heating being effected in an inert atmosphere whereby there is formed an oxide phase comprising the oxide of said metal having boron carbide dispersed therein as the disperse phase.

19. A process according to claim 6, wherein the fluid system contains at least one metal compound of an anion selected from the group consisting of halides, oxyhalides, sulfates, sulfites, thiocyanates, alkoxides, formates, acetates, cyanides, carbonates and hydroxides, at least one organic compound decomposible into carbon on heating, and at least one boron compound decomposible into boron upon heating, heating being effected in an inert atmosphere whereby there is formed an oxide phase comprising the oxide of said metal having boron carbide dispersed therein as the disperse phase.

20. A process according to claim 19, wherein the organic compound decomposible into carbon comprises a polymer of acrylonitrile and the boron compound decomposible into boron comprises $(NH_4)_2B_{12}H_{12}$.

21. A process according to claim 6, wherein the fluid system comprises an organic solvent having said metal compound dissolved therein along with a carbosilane of relatively high molecular weight whereby upon heating there is produced an oxide phase comprising the oxide of said metal having SiC dispersed therein as the disperse phase.

22. A process according to claim 6, wherein the fluid system comprises an organic solvent having said metal compound dissolved therein along with an alkyl silazane whereby upon heating there is produced an oxide phase comprising the oxide of said metal having silicon nitride dispersed therein as the disperse phase.

23. A process according to claim 6, wherein the fluid system contains at least one metal salt of an acid selected from the group consisting of saturated and unsaturated aliphatic, aromatic and mixed aliphatic-aromatic mono-, and polycarboxylic acids and their hydroxy, oxo, amino, or sulfonic acid substitution products, at least some of the metal salt consisting of a chromium salt, heating being carried out under nitrogen at a temperature above about 1000° C, whereby there is formed an oxide phase having chromium nitride dispersed therein as the disperse phase.

24. A process according to claim 6, wherein the fluid system contains at least one metal compound of an anion selected from the group consisting of halides, oxyhalides, sulfates, sulfites, nitrates, formates, acetates, nitrites, alkoxides, thiocyanates, cyanides, carbonates and hydroxides, at least some of the metal compound consisting of a chromium compound, the fluid system further containing an organic compound decomposible into carbon on heating, heating being carried out under nitrogen at a temperature above about 1000° C whereby the disperse phase comprises chromium nitride.

25. A process according to claim 6, wherein the metal compound comprises an aluminum compound.

26. A process according to claim 25, wherein the aluminum compound comprises the aluminum salt of an anion selected from the group consisting of formates, acetates, oxalates, citrates and tartrates, whereby upon heating there is formed an oxide phase comprising $Al_2O_3$ having carbon dispersed therein as the disperse phase.

27. A process according to claim 23, wherein the fluid system comprises water having dissolved therein an aluminum salt of an anion selected from the group consisting of chlorides, bromides, iodides, oxychlorides, sulfates, sulfites, nitrates, nitrites, thiocyanates, cyanides, hydroxides, carbonates, formates and acetates, and at least one water-soluble organic compound selected from the group consisting of monosaccharides, polysaccharides, lignin, thiolignin, alkali lignin, lignin sulfonic acid and lignin sulfonates, whereby upon heating there is formed an oxide phase comprising $Al_2O_3$ having carbon dispersed therein as the disperse phase.

28. A process according to claim 25, wherein heating is carried out at a temperature up to about 1150° C.

29. A process according to claim 28 wherein heating is carried out at a rate of from about 2° to 10° C/min. up to temperatures of about 500° C and at a rate of from about 8° to 60° C/min. at temperature in excess of about 500° C.

30. A process according to claim 29, wherein the maximum temperature is maintained for a period of from about 10 minutes to 2 hours.

31. A process according to claim 6, wherein the fluid system contains a mixture of magnesium and aluminum salts in a molar ratio of Mg to Al of from 2:1 to 1:6, whereby the oxide phase consists of MgO and $Al_2O_3$, the fluid system further containing an anion selected from the group consisting of saturated and unsaturated aliphatic, aromatic and mixed aliphatic-aromatic mono-, and poly-carboxylic acids and their hydroxy, oxo, amino or sulfonic acid substitution products, or at least one water-soluble organic compound selected from the group consisting of mono- and polysaccharides, lignin, thiolignin, alkali lignin, lignin sulfonic acid, lignin sulfonates, gelatin, glue, agar-agar, casein, tragacanth, polyvinyl alcohol and polyethylene glycol, the disperse phase thus consisting of carbon.

32. A process according to claim 31, wherein the mixture of salts is produced by dissolving Mg or a magnesium compound of an anion selected from the group consisting of carbonates, hydroxides, oxalates, tartrates, formates, acetates and citrates, in a solution of an aluminum compound of an anion selected from the group consisting formate, oxalate, citrate and tartrated.

33. A process according to claim 6, wherein the fluid system contains a mixture of aluminum and chromium salts of at least one anion selected from the group consisting of saturated and unsaturated aliphatic, aromatic and mixed aliphatic-aromatic mono-, di- and polycarboxylic acids and their hydroxy, oxo, amino or sulfonic acid substitution products, the molar ratio of Al:Cr ranging from about 1:1 to 1:99, heating being effected in a nitrogen atmosphere whereby the oxide phase consists essentially of $Al_2O_3$ and $Cr_2O_3$ with chromium nitride as the disperse phase.

34. A process according to claim 12, wherein said metal comprises Al.

35. A process according to claim 12, wherein said metal comprises Cr optionally admixed with Al.

36. A process according to claim 12, wherein said metal comprises a mixture of Li and Al.

37. A process according to claim 12, wherein said metal comprises Mg optionally admixed with Al.

38. A process according to claim 13 wherein said metal comprises Al optionally admixed with Li or Mg.

39. A process according to claim 8, wherein heating is conducted to form a disperse phase having a crystallite size of less than about 250 Å.

* * * * *

UNITED STATES PATENT OFFICE
CERTIFICATE OF CORRECTION

Patent No. 4,010,233　　　　　　　　　Dated March 1, 1977

Inventor(s) Gerhard Winter et al.

It is certified that error appears in the above-identified patent and that said Letters Patent are hereby corrected as shown below:

Column 1, line 31, "or" should read -- of --.

Column 7, line 44, after "for example" insert -- from --.

Column 9, line 59, "oxid" should read -- oxide --.

Column 13, line 36, after "Si" delete "of".

Column 15, line 31, "rsin" should read -- resin --.

Column 15, line 48, "85.3" should read -- 85.3 g --.

Column 19, line 44, "cnsisted" should read -- consisted --.

Column 20, line 53, "are" should read -- were --.

Column 23, line 33, delete "and", second occurrence.

Column 23, claim 5, line 67, "on" should read -- one --.

Column 26, claim 29, line 45, "temperature" should read -- temperatures --.

Column 27, claim 32, line 3, after "consisting" insert -- of --.

UNITED STATES PATENT OFFICE
CERTIFICATE OF CORRECTION

Patent No. 4,010,233      Dated March 1, 1977

Inventor(s) Gerhard Winter et al.

It is certified that error appears in the above-identified patent and that said Letters Patent are hereby corrected as shown below:

Column 27, claim 32, line 3, "tartrated" should read

-- tartrate --.

Signed and Sealed this

Sixth Day of September 1977

[SEAL]

Attest:

RUTH C. MASON  
*Attesting Officer*

LUTRELLE F. PARKER  
*Acting Commissioner of Patents and Trademarks*